Jan. 18, 1927.
J. G. PENNELL
1,614,931
FISH HOOKING DEVICE
Filed Oct. 18, 1924
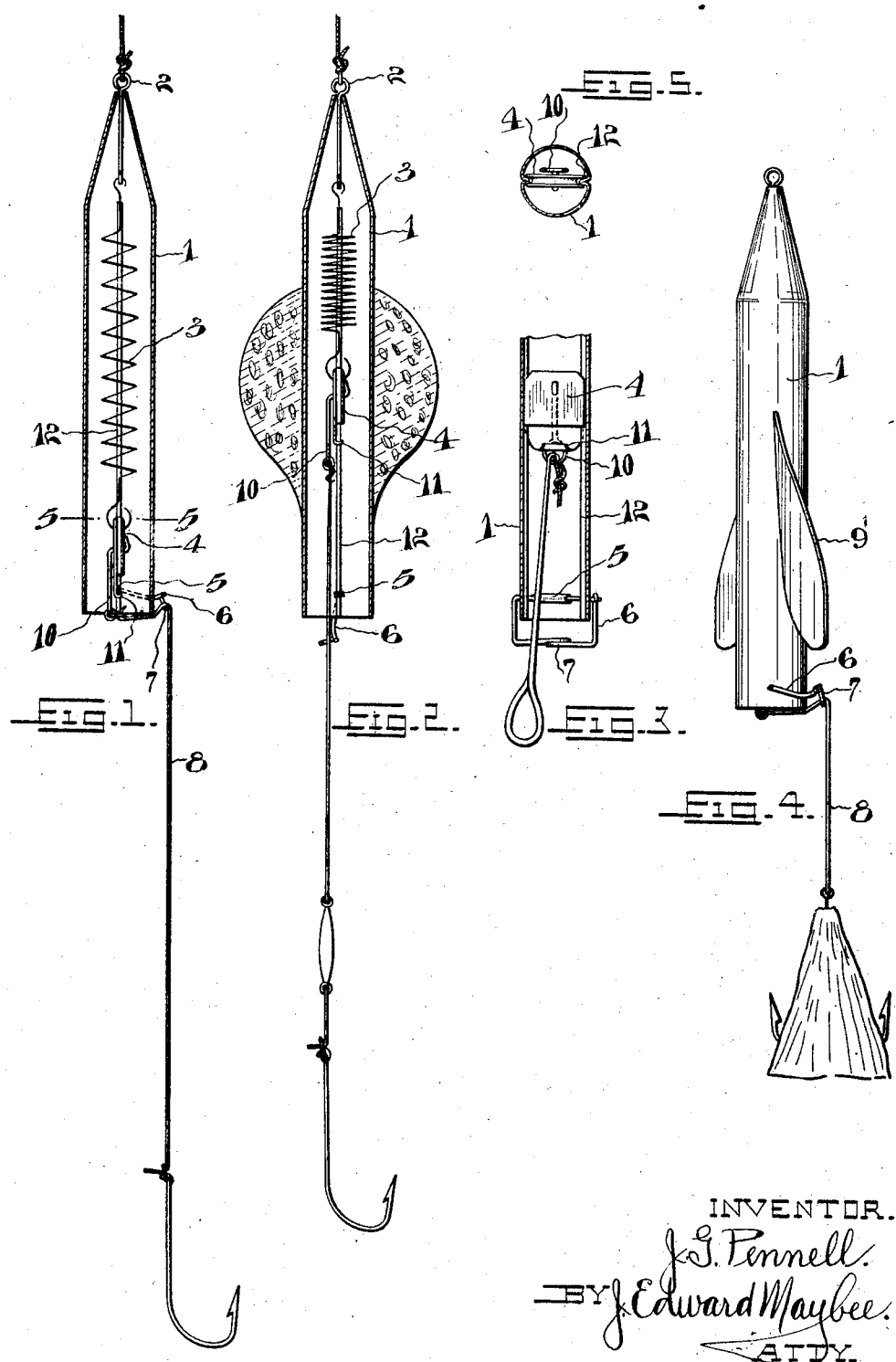
INVENTOR.
J. G. Pennell.
BY J. Edward Maybee.
ATTY.

Patented Jan. 18, 1927.

1,614,931

UNITED STATES PATENT OFFICE.

JOHN GEORGE PENNELL, OF TORONTO, ONTARIO, CANADA.

FISH-HOOKING DEVICE.

Application filed October 18, 1924. Serial No. 744,506.

This invention relates to devices for automatically jerking on the leader of a fishing line to set the hook in a fish's jaw, when the bait has been seized, and my object is to produce a device of this type in which the mechanism is substantially entirely enclosed, in which the pull on the leader is substantially in a right line, which is easily set, and which is so constructed that in event of the leader breaking within the device, a new one is readily attached.

I attain my object by means of the constructions hereinafter fully described and illustrated in the accompanying drawings in which—

Fig. 1 is a longitudinal section of my device arranged for trolling; and

Fig. 2 a similar view, showing the parts in the position they assume after the device has been tripped;

Fig. 3 a longitudinal section of part of the device, illustrating the method of setting the device so that a broken leader may be replaced;

Fig. 4 a side elevation, showing the device arranged for trolling; and

Fig. 5 a cross section on the line 5—5 in Fig. 1.

In the drawings like numerals of reference indicate corresponding parts in the different figures.

1 is a frame, preferably formed as a cylindrical casing, pointed at its upper end and provided with an eye 2, by means of which it may be connected to a line. Within this cylinder is secured one end of a coil spring 3, the other end of which is connected with a slide 4 which is adapted to hook over a trigger bar 5 journalled adjacent the lower end of the frame. This bar is formed on or connected with a bail 6 external of the tube, and which is provided with an eye 7.

The trigger bar, it will be noted, is flattened, the result of which is that, when the flattened sides of the bar are substantially parallel to the axis of the cylinder, the bar will retain the slide 4 with the coil spring extended. While, if the bar be rocked to bring the flattened sides transverse of the cylinder, the catch will pull off the trigger bar, and the coil spring is thus left free to retract.

A leader 8, carrying the hook, passes through the eye 7 of the bail 6, and is secured to an eye 10 which is secured to the slide 4 and extends down below a hook 11, by means of which the slide engages the trigger bar. This eye is preferably formed of a bent wire hooked through the slide 4 as shown in the drawings. When the device is set, the bail 6 extends laterally, and the result is that a jerk on the leader will rock the bail 6 and consequently the trigger bar 5, thus releasing the spring as hereinbefore described. The contraction of the spring gives a sharp upward pull on the leader carrying the hook, thus setting the hook in the fish's jaw as desired.

The setting of the device is effected by pulling on the leader between the eye 7 and the eye 10 until the hook 11 will engage with the trigger bar, the device being held in such a position that the weight of the bail tends to rock the trigger bar to a position to automatically engage the hook when the latter is suitably positioned. The device is self-setting in the sense that there is no need for any manual operation of the trigger mechanism.

An important feature of the present construction is that the mechanism is substantially entirely contained within the casing. A further important advantage is that the pull on the leader is substantially rectilinear in the direction of the length of the device.

The importance of the eye 10 will be best understood on reference to Figure 3. If the leader breaks close to the slide 4, the eye 10 may be engaged by a bent wire or other suitable hook and drawn down till it is engaged by the trigger bar. The eye is then exposed, as shown in Fig. 1, in a position convenient for the attachment of a fresh leader.

The device may be used either with or without a float and, if used with a float, the float may be incorporated with the frame 1, as indicated in Fig. 2. The device may also be used for trolling, in which case suitable fins or vanes 9 may be formed on the frame as shown in Fig. 4. The slide 4 may be left entirely free, but is preferably guided longitudinally of the frame. When the frame is a cylinder, as shown, the guides may be formed by pressing beads 12 in the sheet metal from which the cylinder is formed, and the sides of the slide suitably grooved, as shown particularly in Fig. 5, to embrace these beads.

What I claim is:—

1. In a fish hooking device, the combination of a tubular frame having an inwardly pressed longitudinal bead at each side; a slide movable on said beads as guides; a spring connected to the slide and the frame; a leader secured to the slide; a trigger pivoted on the frame and engageable by the slide to hold it with the spring in tension, the trigger, when set, being releasable by a pull on the leader.

2. In a fish hooking device, the combination of a frame; a slide movable longitudinally of the frame; a spring connected to the slide and the frame; a leader connected to the slide; and a trigger pivoted on the frame and provided with a flattened portion adapted, when the flattened sides thereof are positioned substantially longitudinal of the frame, to be engaged by the slide to hold it with the spring in tension and adapted to release the slide when the flattened sides of the trigger are positioned substantially transverse of the frame, the trigger, when set, being releasable by a pull on the leader.

3. In a fish hooking device, the combination of a frame; a slide movable longitudinally of the frame; a spring connected to the slide and the frame; a leader connected to the slide; and a bail pivoted on the frame and provided with a trigger bar having flattened sides adapted, when positioned substantially parallel to the longitudinal walls of the frame, to be engaged by the slide to hold it with the spring in tension and adapted to release the slide when the flattened sides of the trigger bar are positioned substantially transverse of the frame, the leader being carried over the bail whereby a pull on the former will rock the latter to release the slide.

4. In a fish hooking device, the combination of a frame; a slide movable longitudinally of the frame; a spring connected to the slide and the frame; a leader connected to the slide; and a bail pivoted on the frame and provided with a trigger bar having flattened sides adapted, when positioned substantially parallel to the longitudinal walls of the frame, to be engaged by the slide to hold it with the spring in tension and adapted to release the slide when the flattened sides of the trigger bar are positioned substantially transverse of the frame, the bail being provided with an eye through which the leader passes.

5. In a fish hooking device, the combination of a cylindrical tubular frame having inwardly pressed longitudinal beads arranged diametrically opposite one another; a slide movable on said beads as guides; a leader secured to the slide; and a trigger pivoted on the frame and provided with a flattened portion adapted, when the flattened sides thereof are substantially parallel to the axis of the said frame, to be engaged by the slide to hold it with the spring in tension and adapted to release the slide when the flattened sides of the trigger are positioned substantially transverse of the frame, the trigger, when set, being releasable by a pull on the leader.

Signed at Toronto, Canada, this 1st day of Feb., 1924.

JOHN GEORGE PENNELL